(12) United States Patent
Usami

(10) Patent No.: US 6,731,746 B1
(45) Date of Patent: May 4, 2004

(54) AUTOMATIC SORTING SYSTEM AND METHOD FOR ELECTRONIC TELEPHONE DIRECTORY

(75) Inventor: Shinya Usami, Tokyo (JP)

(73) Assignee: NEC Corporation, Tokyo (JP)

( * ) Notice: Subject to any disclaimer, the term of this patent is extended or adjusted under 35 U.S.C. 154(b) by 226 days.

(21) Appl. No.: 09/593,774

(22) Filed: Jun. 14, 2000

(30) Foreign Application Priority Data

Jun. 15, 1999 (JP) .......................................... 11-168585

(51) Int. Cl.[7] .............................................. H04M 1/00
(52) U.S. Cl. .................... 379/356.01; 379/354
(58) Field of Search ............... 379/354, 356.01, 379/201.03, 114.29; 709/220

(56) References Cited

U.S. PATENT DOCUMENTS

| | | | |
|---|---|---|---|
| 5,267,308 A | * 11/1993 | Jokinen et al. | 379/354 |
| 5,297,189 A | * 3/1994 | Chabernaud | 455/461 |
| 5,592,546 A | 1/1997 | Takahashi | |
| 6,243,459 B1 | * 6/2001 | Cannon et al. | 379/354 |
| 6,301,350 B1 | * 10/2001 | Henningson et al. | 379/220.01 |

FOREIGN PATENT DOCUMENTS

| | | |
|---|---|---|
| EP | 0 477 854 A2 | 4/1992 |
| EP | 0 709 996 A2 | 5/1996 |
| GB | 2 341 040 | 3/2000 |
| JP | A 1-238254 | 9/1989 |
| JP | A 3-53737 | 3/1991 |
| JP | 5-48704 | 2/1993 |
| JP | 6-334726 | 12/1994 |
| JP | A 7-182372 | 7/1995 |
| JP | 7-182372 | 7/1995 |
| JP | A 9-51373 | 2/1997 |
| JP | A 10-126486 | 5/1998 |
| JP | A 11-68918 | 8/1999 |
| WO | WO 98/27706 | 6/1998 |

* cited by examiner

Primary Examiner—Ahmad F. Matar
Assistant Examiner—Karen Le
(74) Attorney, Agent, or Firm—Young & Thompson

(57) ABSTRACT

An automatic sorting system for an electronic telephone directory to sort telephone numbers in the electronic telephone directory prepares a calling information list which indicates an expected calling frequency in each day of the week and time period on the basis of a priority numerical value of the telephone numbers according to the calling times and function setting conditions of the telephone numbers in each day of the week and time period; and automatically sorts and indicates the telephone numbers in lowering order of the expected calling frequency with reference to the calling information list for days of the week and time periods when the electronic telephone directory is opened.

14 Claims, 11 Drawing Sheets

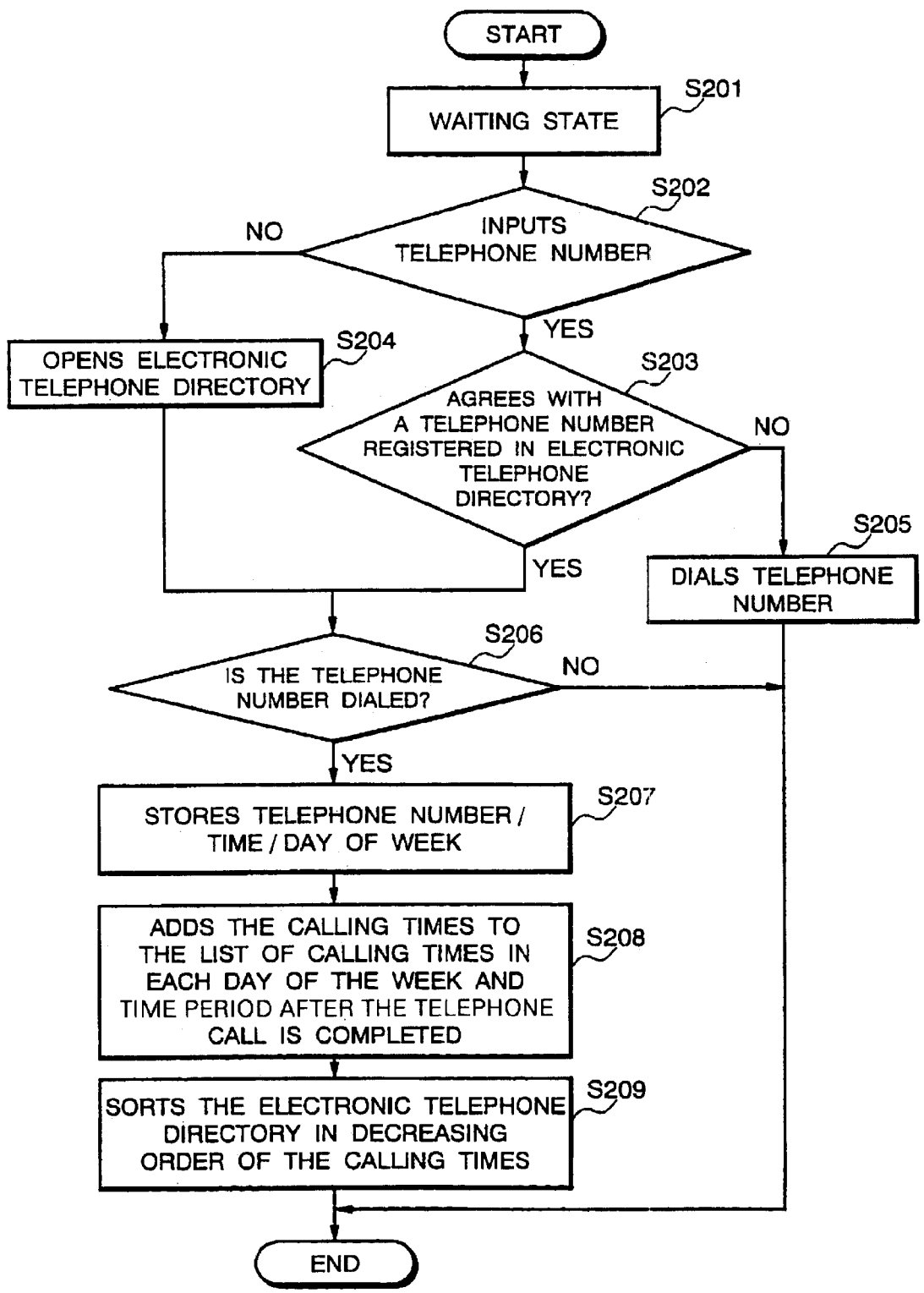

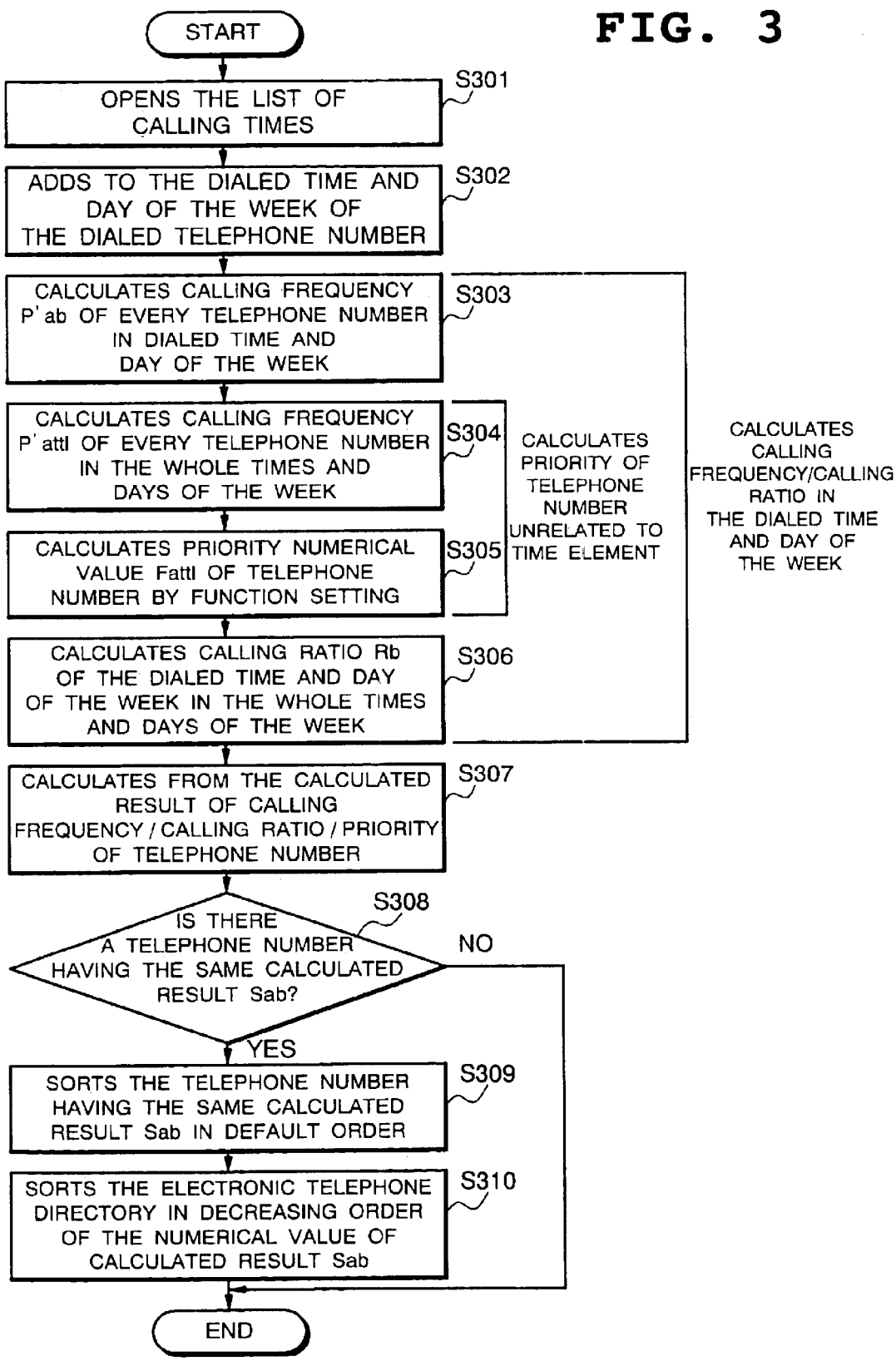

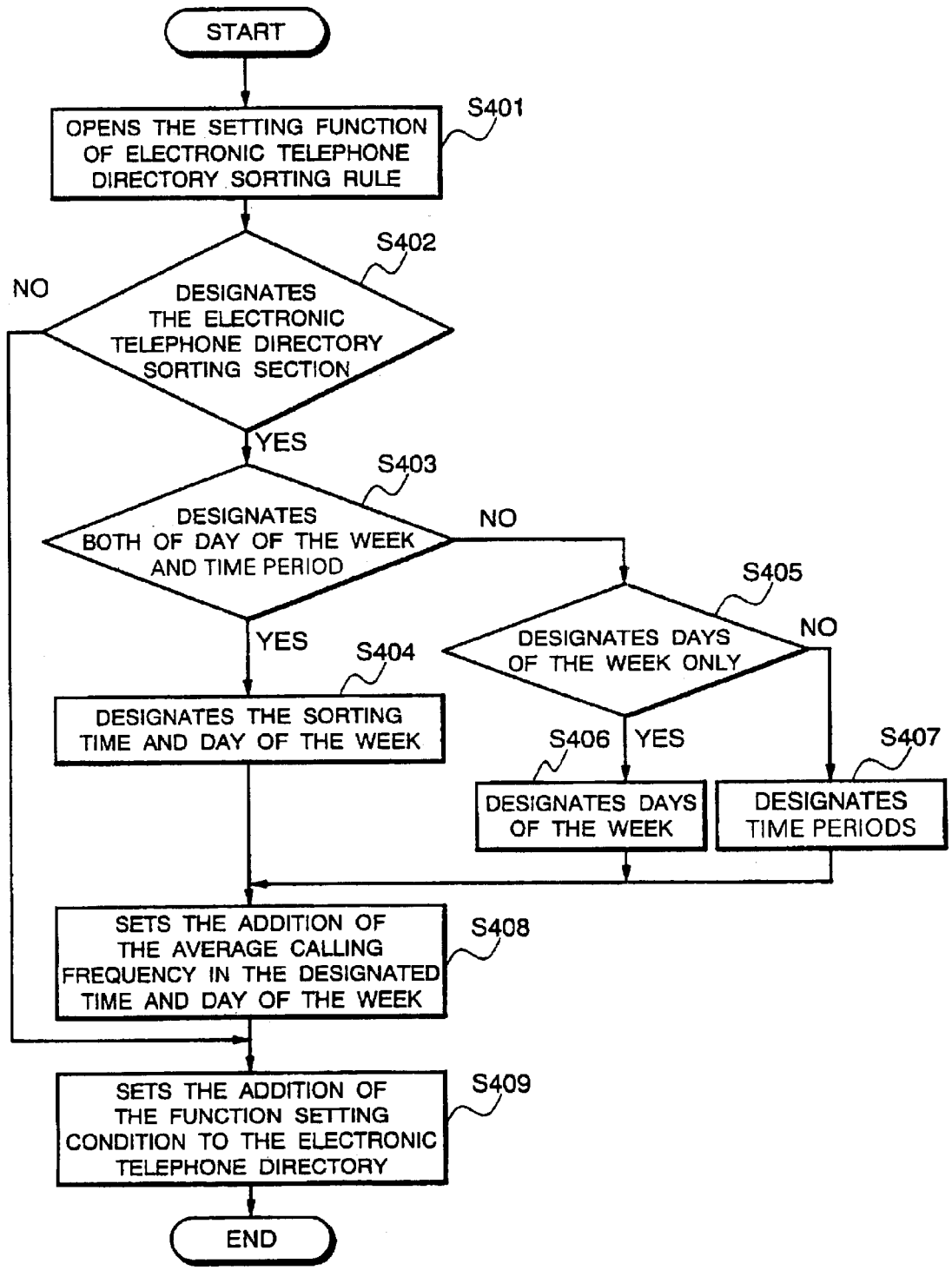

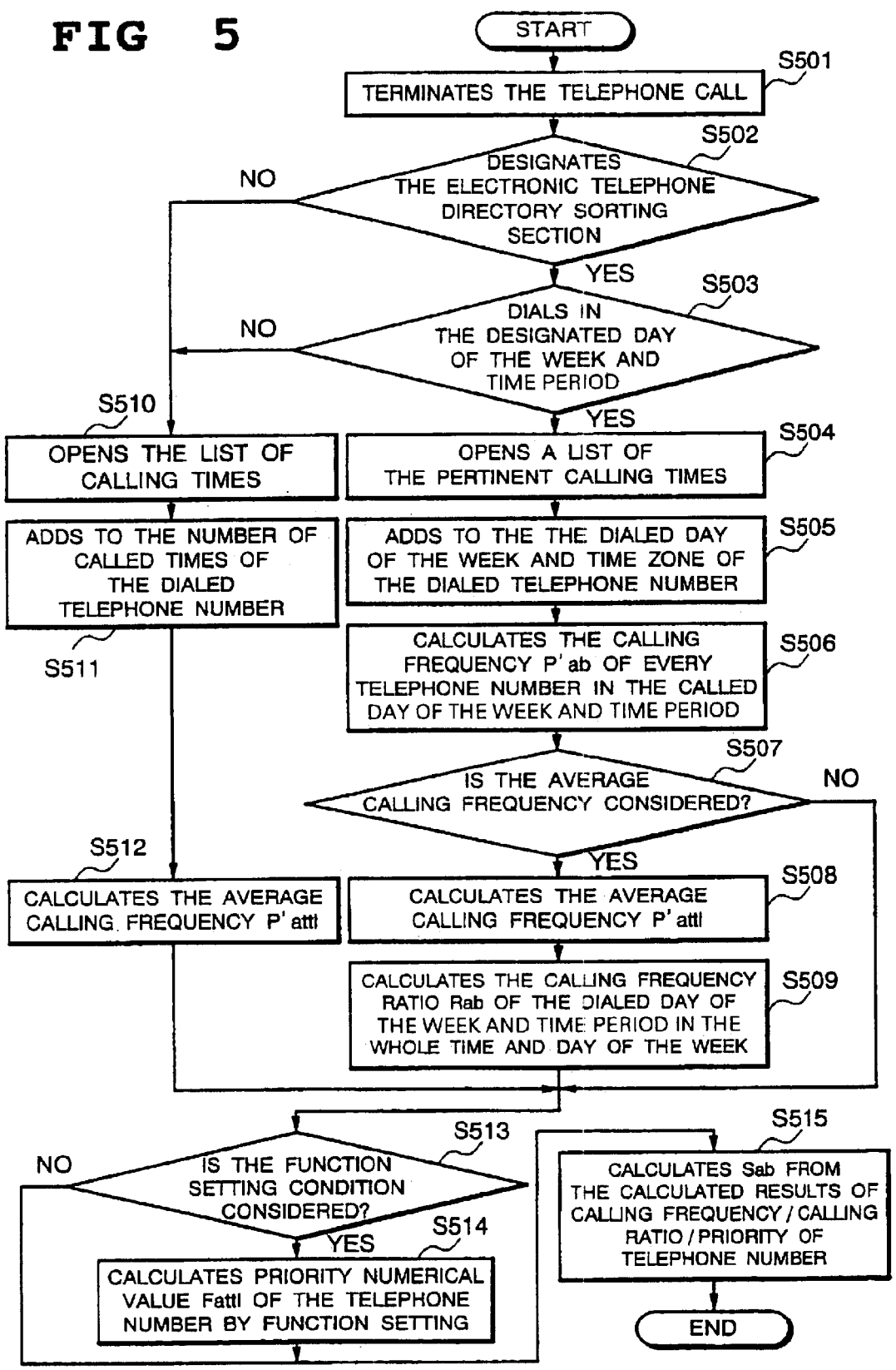

FIG. 6

LIST OF CALLING TIMES OF EVERY TELEPHONE NUMBER IN TIME AND DAY OF THE WEEK

| LIST NO.<br>TELEPHONE NUMBER | 11 | 12 | 13 | 14 | ... | 71 | 72 | 73 | 74 | TOTAL(b) |
|---|---|---|---|---|---|---|---|---|---|---|
| | SUNDAY | | | | ... | SATURDAY | | | | |
| | 6:00– | 12:00– | 18:00– | 24:00– | ... | 6:00– | 12:00– | 18:00– | 24:00– | |
| TELEPHONE NUMBER 1 | X00111 | X00112 | X00113 | X00114 | ... | X00171 | X00172 | X00173 | X00174 | X001ttl |
| TELEPHONE NUMBER 2 | X00211 | X00212 | X00213 | X00214 | ... | X00271 | X00272 | X00273 | X00274 | X002ttl |
| TELEPHONE NUMBER 3 | X00311 | X00312 | X00313 | X00314 | ... | X00371 | X00372 | X00373 | X00374 | X003ttl |
| TELEPHONE NUMBER 4 | X00411 | X00412 | X00413 | X00414 | ... | X00471 | X00472 | X00473 | X00474 | X004ttl |
| TELEPHONE NUMBER 5 | X00511 | X00512 | X00513 | X00514 | ... | X00571 | X00572 | X00573 | X00574 | X005ttl |
| TELEPHONE NUMBER 6 | X00611 | X00612 | X00613 | X00614 | ... | X00671 | X00672 | X00673 | X00674 | X006ttl |
| ... | ... | ... | ... | ... | ... | ... | ... | ... | ... | ... |
| TELEPHONE NUMBER n | Xn11 | Xn12 | Xn13 | Xn14 | ... | Xn71 | Xn72 | Xn73 | Xn74 | Xnttl |
| TOTAL(a) | Xttl11 | Xttl12 | Xttl13 | Xttl14 | ... | Xttl71 | Xttl72 | Xttl73 | Xttl74 | Xttlttl |

FIG. 7

LIST OF CALLING FREQUENCY OF EVERY TELEPHONE NUMBER IN TIME AND DAY OF THE WEEK

| LIST NO.<br>TELEPHONE NUMBER | 11 | 12 | 13 | 14 | ... | 71 | 72 | 73 | 74 | AVERAGE |
|---|---|---|---|---|---|---|---|---|---|---|
| TELEPHONE NUMBER | SUNDAY | | | | ... | SATURDAY | | | | |
| | 6:00- | 12:00- | 18:00- | 24:00- | ... | 6:00- | 12:00- | 18:00- | 24:00- | |
| TELEPHONE NUMBER 1 | P00111 | P00112 | P00113 | P00114 | ... | P00171 | P00172 | P00173 | P00174 | P001ttl |
| TELEPHONE NUMBER 2 | P00211 | P00212 | P00213 | P00214 | ... | P00271 | P00272 | P00273 | P00274 | P002ttl |
| TELEPHONE NUMBER 3 | P00311 | P00312 | P00313 | P00314 | ... | P00371 | P00372 | P00373 | P00374 | P003ttl |
| TELEPHONE NUMBER 4 | P00411 | P00412 | P00413 | P00414 | ... | P00471 | P00472 | P00473 | P00474 | P004ttl |
| TELEPHONE NUMBER 5 | P00511 | P00512 | P00513 | P00514 | ... | P00571 | P00572 | P00573 | P00574 | P005ttl |
| TELEPHONE NUMBER 6 | P00611 | P00612 | P00613 | P00614 | ... | P00671 | P00672 | P00673 | P00674 | P006ttl |
| ... | ... | ... | ... | ... | ... | ... | ... | ... | ... | ... |
| TELEPHONE NUMBER 7 | Pn11 | Pn12 | Pn13 | Pn14 | ... | Pn71 | Pn72 | Pn73 | Pn74 | Pnttl |
| TOTAL | 1 | 1 | 1 | 1 | ... | 1 | 1 | 1 | 1 | 1 |

FIG. 8

ADDITION WHEN TELEPHONE NUMBER 1 IS CALLED AT 6:00 - 12:00 ON SUNDAY

| LIST NO.<br>TELEPHONE NUMBER | 11 | 12 | 13 | 14 | ... | 71 | 72 | 73 | 74 | TOTAL(b) |
|---|---|---|---|---|---|---|---|---|---|---|
| | SUNDAY | | | | ... | SATURDAY | | | | |
| | 6:00– | 12:00– | 18:00– | 24:00– | ... | 6:00– | 12:00– | 18:00– | 24:00– | |
| TELEPHONE NUMBER 1 | X00111+1 | X00112 | X00113 | X00114 | ... | X00171 | X00172 | X00173 | X00174 | X001ttl+1 |
| TELEPHONE NUMBER 2 | X00211 | X00212 | X00213 | X00214 | ... | X00271 | X00272 | X00273 | X00274 | X002ttl |
| TELEPHONE NUMBER 3 | X00311 | X00312 | X00313 | X00314 | ... | X00371 | X00372 | X00373 | X00374 | X003ttl |
| TELEPHONE NUMBER 4 | X00411 | X00412 | X00413 | X00414 | ... | X00471 | X00472 | X00473 | X00474 | X004ttl |
| TELEPHONE NUMBER 5 | X00511 | X00512 | X00513 | X00514 | ... | X00571 | X00572 | X00573 | X00574 | X005ttl |
| TELEPHONE NUMBER 6 | X00611 | X00612 | X00613 | X00614 | ... | X00671 | X00672 | X00673 | X00674 | X006ttl |
| ... | ... | ... | ... | ... | ... | ... | ... | ... | ... | ... |
| TELEPHONE NUMBER n | Xn11 | Xn12 | Xn13 | Xn14 | ... | Xn71 | Xn72 | Xn73 | Xn74 | Xnttl |
| TOTAL(a) | Xttl11+1 | Xttl12 | Xttl13 | Xttl14 | ... | Xttl71 | Xttl72 | Xttl73 | Xttl74 | Xttlttl+1 |

FIG. 9

RESULTS OF RECALCULATION OF THE LIST OF CALLING FREQUENCY OF EVERY TELEPHONE NUMBER IN TIME AND DAY OF THE WEEK OF FIG.7 ACCORDING TO FIG.8

| LIST NO. / TELEPHONE NUMBER | 11 | 12 | 13 | 14 | ... | 71 | 72 | 73 | 74 | AVERAGE |
|---|---|---|---|---|---|---|---|---|---|---|
| TELEPHONE NUMBER | 6:00– | SUNDAY 12:00– | 18:00– | 24:00– | ... | 6:00– | SATURDAY 12:00– | 18:00– | 24:00– | |
| TELEPHONE NUMBER 1 | P'00111 | P00112 | P00113 | P00114 | ... | P00171 | P00172 | P00173 | P00174 | P'001ttl |
| TELEPHONE NUMBER 2 | P'00211 | P00212 | P00213 | P00214 | ... | P00271 | P00272 | P00273 | P00274 | P'002ttl |
| TELEPHONE NUMBER 3 | P'00311 | P00312 | P00313 | P00314 | ... | P00371 | P00372 | P00373 | P00374 | P'003ttl |
| TELEPHONE NUMBER 4 | P'00411 | P00412 | P00413 | P00414 | ... | P00471 | P00472 | P00473 | P00474 | P'004ttl |
| TELEPHONE NUMBER 5 | P'00511 | P00512 | P00513 | P00514 | ... | P00571 | P00572 | P00573 | P00574 | P'005ttl |
| TELEPHONE NUMBER 6 | P'00611 | P00612 | P00613 | P00614 | ... | P00671 | P00672 | P00673 | P00674 | P'006ttl |
| ... | ... | ... | ... | ... | ... | ... | ... | ... | ... | ... |
| TELEPHONE NUMBER n | P'n11 | Pn12 | Pn13 | Pn14 | ... | Pn71 | Pn72 | Pn73 | Pn74 | P'nttl |
| TOTAL | 1 | 1 | 1 | 1 | ... | 1 | 1 | 1 | 1 | 1 |

FIG. 10

CALCULATION OF PRIORITY OF TELEPHONE NUMBERS BY FUNCTION SETTING

| LIST NO. / TELEPHONE NUMBER | 01 VOICE RECOGNITION REGISTRATION | | ... | M CALLING NUMBER NOTIFICATION-RELATED FUNCTION | | F TOTAL |
|---|---|---|---|---|---|---|
| TELEPHONE NUMBER | | | | | | |
| TELEPHONE NUMBER 1 | Y00101 | F00101 | ... | Y001m | F001m | F001ttl |
| TELEPHONE NUMBER 2 | Y00201 | F00201 | ... | Y002m | F002m | F002ttl |
| TELEPHONE NUMBER 3 | Y00301 | F00301 | ... | Y003m | F003m | F003ttl |
| TELEPHONE NUMBER 4 | Y00401 | F00401 | ... | Y004m | F004m | F004ttl |
| TELEPHONE NUMBER 5 | Y00501 | F00501 | ... | Y005m | F005m | F005ttl |
| TELEPHONE NUMBER 6 | Y00601 | F00601 | ... | Y006m | F006m | F006ttl |
| ... | ... | ... | ... | ... | ... | ... |
| TELEPHONE NUMBER n | Yn01 | Fn01 | ... | Ynm | Fnm | Fnttl |
| TOTAL | Yttl01 | — | ... | Yttlm | — | — |

Q01 spans the "VOICE RECOGNITION REGISTRATION" column values; Qm spans the "CALLING NUMBER NOTIFICATION-RELATED FUNCTION" column values.

FIG.11

LIST OF CALCULATED RESULTS OF Sab

| LIST NO.<br>TELEPHONE NUMBER | 11 | 12 | 13 | 14 | ... | 71 | 72 | 73 | 74 |
|---|---|---|---|---|---|---|---|---|---|
| TELEPHONE NUMBER | SUNDAY | | | | ... | SATURDAY | | | |
| | 6:00– | 12:00– | 18:00– | 24:00– | ... | 6:00– | 12:00– | 18:00– | 24:00– |
| TELEPHONE NUMBER 1 | S00111 | S00112 | S00113 | S00114 | ... | S00171 | S00172 | S00173 | S00174 |
| TELEPHONE NUMBER 2 | S00211 | S00212 | S00213 | S00214 | ... | S00271 | S00272 | S00273 | S00274 |
| TELEPHONE NUMBER 3 | S00311 | S00312 | S00313 | S00314 | ... | S00371 | S00372 | S00373 | S00374 |
| TELEPHONE NUMBER 4 | S00411 | S00412 | S00413 | S00414 | ... | S00471 | S00472 | S00473 | S00474 |
| TELEPHONE NUMBER 5 | S00511 | S00512 | S00513 | S00514 | ... | S00571 | S00572 | S00573 | S00574 |
| TELEPHONE NUMBER 6 | S00611 | S00612 | S00613 | S00614 | ... | S00671 | S00672 | S00673 | S00674 |
| ... | . | . | . | . | ... | . | . | . | . |
| TELEPHONE NUMBER n | Sn11 | Sn12 | Sn13 | Sn14 | ... | Sn71 | Sn72 | Sn73 | Sn74 |

AUTOMATIC SORTING SYSTEM AND METHOD FOR ELECTRONIC TELEPHONE DIRECTORY

BACKGROUNDS OF THE INVENTION

1. Field of the Invention

The present invention relates to an automatic sorting system and method for an electronic telephone directory. The present invention particularly relates to an automatic sorting system and method for an electronic telephone directory, which can improve retrieving operability for the electronic telephone directory provided in mobile communication terminal equipment.

2. Description of the Related Art

With conventional mobile communication terminal equipment, the electronic telephone directory in it is designated, and a telephone number selected from the designated electronic telephone directory is dialed or changed.

The electronic telephone directory generally includes telephone numbers which are arranged in alphabetical order of names registered in it or in the order of registration numbers, and when the electronic telephone directory is designated, they are displayed from the top of the arranged order. If a desired telephone number is not displayed when the electronic telephone directory is selected, the user needs to scroll the display of the electronic telephone directory until the desired telephone number is displayed.

The display section of the mobile communication terminal equipment is small, so that the telephone numbers shown on the display are parts of the registered telephone numbers. The more telephone numbers registered in the electronic telephone directory, the more the scrolling operation takes time to display the desired telephone number. And, the user feels it inconvenient.

Because the mobile communication terminal equipment is being improved to be highly functional, the number of telephone numbers registerable in the electronic telephone directory is increasing. And, the telephone numbers and the like registered in the electronic telephone directory include those frequently used and rarely used.

Japanese Patent Application Laid-Open Publication (Kokai) No. Heisei 5-48704 discloses an embodiment that the order of telephone numbers is sorted in the order in which they were used recently in order to reduce time required for the scrolling operation. But, it has a disadvantage that the scrolling operation takes time to select a telephone number used long before.

Japanese Patent Application Laid-Open Publication (Kokai) No. Heisei 6-334726 discloses an embodiment of sorting the telephone numbers of the telephone directory in the order of decreasing number of times of their use. But, it has a drawback that the scrolling operation takes time when it is necessary to dial a telephone number which is not used many times but important.

Japanese Patent Application Laid-Open Publication (Kokai) No. Heisei 7-182372 discloses an embodiment of sorting the telephone numbers in the telephone directory in order in which the use frequency is many in a time period. But, the use frequency of a telephone number is variable depending on a day of the week even in the same time period because use of the telephone number is different in hours/days of the week according to the life style of the user. Therefore, it has a disadvantage that the scrolling operation takes time. Telephone directories having various types of sorting functions as described above are increasing but have a drawback that an operation to select their sorting functions is complex and incomprehensible for the user.

SUMMARY OF THE INVENTION

It is an object of the present invention to provide an automatic sorting system and method for an electronic telephone directory, by which a desired telephone number is displayed when the electronic telephone directory is selected or a desired telephone number is displayed by scrolling for a span of time not troublesome.

According to the first aspect of the invention, an automatic sorting system for an electronic telephone directory to sort telephone numbers in the electronic telephone directory, comprises a calling information list indicating the calling times of telephone numbers in each day and time; and telephone number sorting means which automatically sorts and indicates the telephone numbers in decreasing order of the calling times with reference to the calling information list for days of the week and time periods when the electronic telephone directory is opened.

According to this means, the telephone numbers are sorted on the basis of a record of telephone calls made in the past, namely a time situation, so that the telephone numbers are sorted in conformity with the life style of each user.

According to the second aspect of the invention, an automatic sorting system for an electronic telephone directory to sort telephone numbers in the electronic telephone directory, comprises a calling information list indicating priority numerical values of the telephone numbers according to a function setting condition; and telephone number sorting means which automatically sorts and indicates the telephone numbers in lowering order of the priority with reference to the calling information list according to the function setting condition in which the electronic telephone directory is opened.

According to this means, the telephone numbers are sorted with reference to the priority numeral value on the basis of the function setting situation such as setting of the voice recognition calling function and calling party number notifying function, so that the sorting can be performed in conformity with the life style of each user.

According to the third aspect of the invention, an automatic sorting system for an electronic telephone directory to sort telephone numbers in the electronic telephone directory, comprises a calling information list indicating an expected calling frequency in each day of the week and time period on the basis of a priority numerical value of the telephone numbers according to the calling times and function setting conditions of the telephone numbers in each day of the week and time period; and telephone number sorting means which automatically sorts and indicates the telephone numbers in lowering order of the expected calling frequency with reference to the calling information list for days of the week and time periods when the electronic telephone directory is opened.

According to this means, the telephone numbers are sorted on the basis of a record of telephone calls made in the past, namely a time situation, and the function setting situation such as setting of the voice recognition calling function and calling party number notifying function, so that the sorting can be performed in conformity with the life style of each user.

In the preferred construction, the expected calling frequency (Sab) is expressed as follows:

$$Sab=Rb*'ab+P'attl+Fattl$$

where, Rb*P'ab is (the calling times of the pertinent telephone number in the pertinent day of the week and time period)/(all the calling times of all the telephone numbers), P'attl is (all the calling times of the pertinent telephone number)/(all the calling times of all the telephone numbers), and Fattl is (priority of the pertinent telephone number).

In another preferred construction, the expected calling frequency (Sab) is expressed as follows:

$$Sab=\text{(the calling times of the pertinent telephone number in the pertinent day of the week)}/\text{(all the calling times of all the telephone numbers)}+P'attl+Fattl,$$

where, P'attl is (all the calling times of the pertinent telephone number)/(all the calling times of all the telephone numbers), and Fattl is (priority of the pertinent telephone number).

In another preferred construction, the expected calling frequency (Sab) is expressed as follows:

$$Sab=\text{(the calling times of the pertinent telephone number in the pertinent time period}/\text{(all the calling times of all the telephone numbers)}+P'attl+Fattl,$$

where, P'attl is (all the calling times of the pertinent telephone number)/(all the calling times of all the telephone numbers), and Fattl is (priority of the pertinent telephone number).

In another preferred construction, the expected calling frequency (Sab) is expressed as follows:

$$Sab=Fattl,$$

where, Fattl is (priority of the pertinent telephone number).

In another preferred construction, the expected calling frequency (Sab) is expressed as follows:

$$Sab=Rb*P'ab+Fattl,$$

where, Rb*P'ab is (the calling times of the pertinent telephone number in the pertinent day of the week and time period)/(all the calling times of all the telephone numbers), and Fattl is (priority of the pertinent telephone number).

In another preferred construction, the expected calling frequency (Sab) is expressed as follows:

$$Sab=Rb*P'ab+P'attl,$$

where, Rb*P'ab is (the calling times of the pertinent telephone number in the pertinent day of the week and time period)/(all the calling times of all the telephone numbers), and P'attl is (all the calling times of the pertinent telephone number)/(all the calling times of all the telephone numbers).

In another preferred construction, the expected calling frequency (Sab) is expressed as follows:

$$Sab=P'attl+Fattl,$$

where, P'attl is (all the calling times of the pertinent telephone number)/(all the calling times of all the telephone numbers), and Fattl is (priority of the pertinent telephone number).

In another preferred construction, the expected calling frequency (Sab) is expressed as follows:

$$Sab=P'attl$$

where, P'attl is (all the calling times of the pertinent telephone number)/(all the calling times of all the telephone numbers).

In another preferred construction, the expected calling frequency (Sab) is expressed as follows:

$$Sab=Rb*P'ab,$$

where, Rb*P'ab is (the calling times of the pertinent telephone number in the pertinent day of the week and the time period)/(all the calling times of all the telephone numbers).

In another preferred construction, the expected calling frequency (Sab) is alternatively selected from the following:

$$Sab=Rb*P'ab+P'attl+Fattl$$

$$Sab=\text{(the calling times of the pertinent telephone number in the pertinent day of the week)}/\text{(all the calling times of all the telephone numbers)}+P'attl+Fattl,$$

$$Sab=\text{(the calling times of the pertinent telephone number in the pertinent time period}/\text{(all the calling times of all the telephone numbers)}+P'attl+Fattl,$$

$$Sab=Fattl,$$

$$Sab=Rb*P'ab+Fattl,$$

$$Sab=Rb*P'ab+P'attl,$$

$$Sab=P'attl+Fattl,$$

$$Sab=P'attl, \text{ and}$$

$$Sab=Rb*P'ab,$$

where, Rb*P'ab is (the calling times of the pertinent telephone number in the pertinent day of the week and time period)/(all the calling times of all the telephone numbers), P'attl is (all the calling times of the pertinent telephone number)/(all the calling times of all the telephone numbers), and Fattl is (priority of the pertinent telephone number).

According to another aspect of the invention, an automatic sorting method for an electronic telephone directory to sort telephone numbers in the electronic telephone directory, comprising a step for preparing as a calling information list the calling times of telephone numbers in each day and time; and a step for automatically sorting and indicating the telephone numbers in decreasing order of the calling times with reference to the calling information list for days of the week and time periods when the electronic telephone directory is opened.

According to another aspect of the invention, an automatic sorting method for an electronic telephone directory to sort telephone numbers in the electronic telephone directory, comprising a step for preparing as a calling information list a priority numerical value of the telephone number according to a function setting condition; and a step for automatically sorting and indicating the telephone numbers in lowering order of the priority with reference to the calling information list according to a function setting condition when the electronic telephone directory is opened.

According to another aspect of the invention, an automatic sorting method for an electronic telephone directory to sort telephone numbers in the electronic telephone directory, comprising a step for preparing as a calling information list an expected calling frequency in each day of the week and time period according to a priority numerical value of the telephone numbers according to the calling times and function setting conditions of the telephone numbers in each day of the week and time period; and a step for automatically sorting and indicating the telephone numbers in lowering order of the expected calling frequency with reference to the calling information list for days of the week and time periods when the electronic telephone directory is opened.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is a flowchart showing a basic controlling operation for automatic sorting of electronic telephone directory 17A in memory 17 by telephone number sorting section 14A of control section 14 shown in FIG. 1;

FIG. 3 is a flowchart showing another example of the automatic sorting controlling operation by the telephone number sorting section 14A of FIG. 2;

FIG. 4 is a flowchart showing another example of the automatic sorting controlling operation by the telephone number sorting section 14A of FIG. 2;

FIG. 5 is a flowchart showing another embodiment of the automatic sorting controlling operation by the telephone number sorting section 14A of FIG. 2;

FIG. 6 is a diagram showing an example of a list of calling times in days of the week and time periods of each telephone number prepared in calling information list 17B;

FIG. 7 is a diagram showing an example of a list of calling frequency in days of the week and time periods of each telephone number prepared in calling information list 17B;

FIG. 8 is a diagram showing an example of addition related to telephone number 1 which is prepared in calling information list 17B and dialed in a time period of 6:00 to 12:00 on Sunday;

FIG. 9 is a diagram showing an example of recalculated results of the list of calling frequency prepared in calling information list 17B of every telephone number in days of the week and time periods;

FIG. 10 is a diagram showing an example of calculation of priority of telephone numbers in function setting prepared in calling information list 17B; and FIG. 11 is a diagram showing an example of a list of calculated results of expected calling frequency Sab prepared in calling information list 17B.

DESCRIPTION OF THE PREFERRED EMBODIMENT

Figure 1:
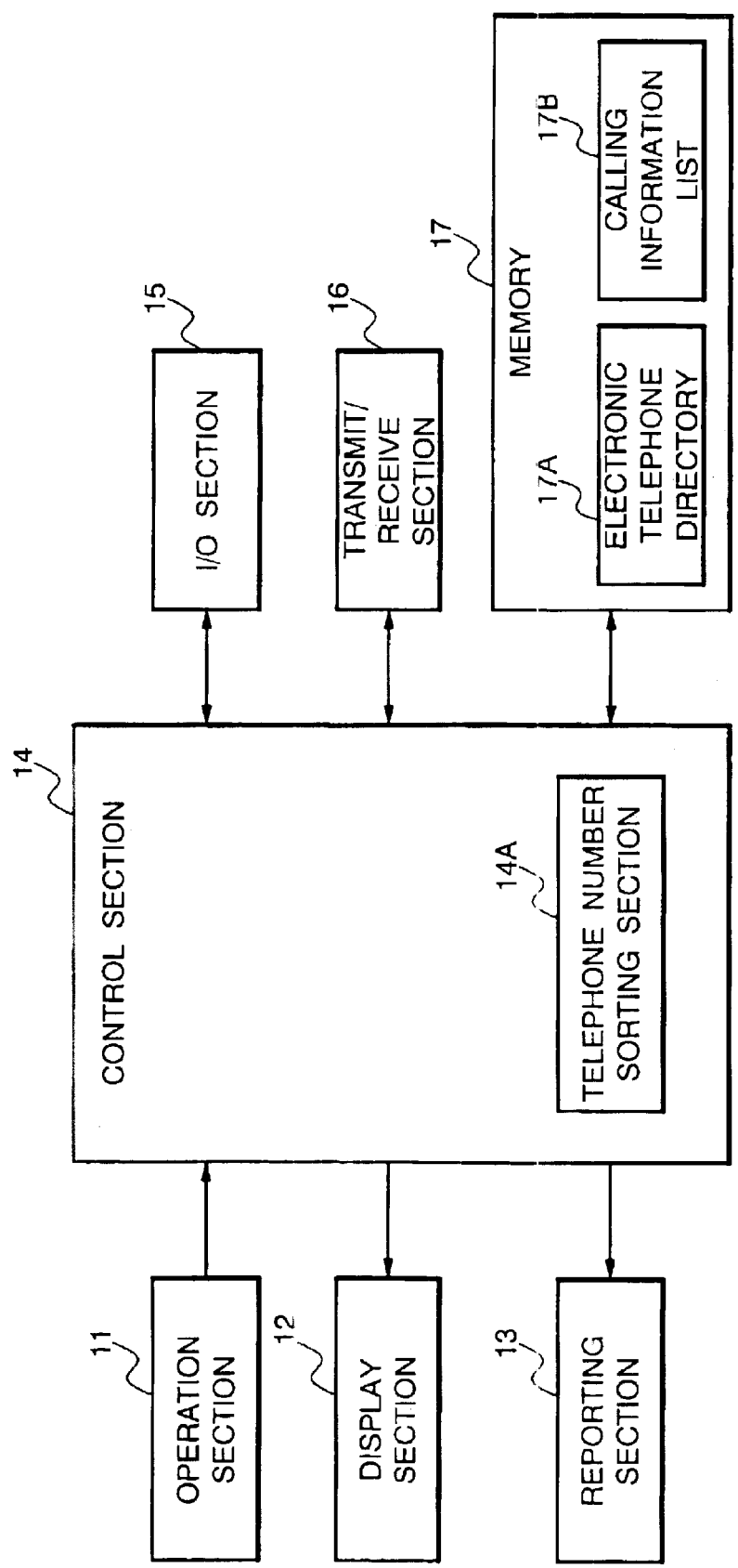
FIG. 1 is a block diagram showing a schematic structure of an example of automatic sorting system for the electronic telephone directory in mobile communication terminal equipment according to the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

An automatic sorting system for an electronic telephone directory according to the present invention makes possible an improvement of retrieving operability for the user to access the electronic telephone directory by automatically sorting telephone numbers of the electronic telephone directory according to a "time situation" such as days of the week and time when the user accesses the electronic telephone directory registered in mobile communication terminal equipment of the present invention and a "function setting situation" of the electronic telephone directory.

The "time situation" means the following:

(1) telephone numbers called are variable depending on days of the week and time, and (2) each user has a different life cycle in days of the week and time depending on the life style.

By managing statistics of a calling frequency in each day of the week and time in view of a record of the past calling, the necessary electronic telephone directory is determined and accessed with priority according to the "time situation" in which the user searches the electronic telephone directory to make a call depending on an individual user's lifestyle.

The "function setting situation" means the following:

the electronic telephone directory includes telephone numbers with priority assigned independent of the calling frequency of telephone numbers (e.g., telephone numbers having been notified electronic telephone directory/calling party number (originating number) with a voice recognition calling function registered).

The telephone numbers in the electronic telephone directory which are given high priority by the user can be accessed with precedence by managing the "function setting situation".

By combining the sorting according to the above "time situation" and the sorting according to the "function setting situation", the present invention makes possible the sorting of telephone numbers in the electronic telephone directory according to the life style of the user and the priority of the telephone numbers and improves the operability to search any telephone number in the electronic telephone directory.

Embodiments of the present invention will be described with reference to the accompanying drawings.

FIG. 1 is a block diagram showing a schematic structure of the automatic sorting system for an electronic telephone directory of mobile communication terminal equipment according to the present invention. As shown in FIG. 1, the mobile communication terminal equipment has an operation section 11, a display section 12 and a reporting section 13.

The operation section 11 receives an operation of the mobile communication terminal equipment, and particularly the registration of a telephone number to the electronic telephone directory.

The display section 12 displays a state of the mobile communication terminal equipment, a waiting state and the like, and particularly necessary information such as a telephone number to be registered in the electronic telephone directory, telephone numbers when the electronic telephone directory is opened, telephone numbers during the scrolling operation and a telephone number to be dialed.

The reporting section 13 reports an incoming call to the mobile communication terminal equipment and a state change. Further, the mobile communication terminal equipment is provided with an I/O section 15, a transmit/receive section 16 and a memory 17.

The I/O section 15 performs voice input and output, and the transmit/receive section 16 performs transmission and reception of radio communications.

The memory 17 is a RAM (Random Access Memory) and has an electronic telephone directory 17A and a calling information list 17B. Other party's names and telephone numbers are registered in the electronic telephone directory 17A. And, calling information of the telephone numbers registered in the electronic telephone directory 17A are stored as a table in the calling information list 17B.

Further, the mobile communication terminal equipment has a control section 14 which controls the operations of the operation section 11, the display section 12, the reporting section 13, the I/O section 15, the transmit/receive section 16 and the memory 17.

Especially, the control section 14 is provided with a telephone number sorting section 14A which refers to the calling information list 17B and controls the sorting of the telephone numbers in the electronic telephone directory 17A in the memory 17 and the preparation of the table of the calling information list 17B.

To edit the electronic telephone directory 17A, English letters and other letters are entered by the operation section 11, the entered numbers and letters are shown on the display section 12, and the entered telephone numbers are stored in the electronic telephone directory 17A as required.

To open the electronic telephone directory 17A, the telephone numbers stored in the electronic telephone directory 17A are selected by operating the operation section 11 and displayed on the display section 12.

To open the electronic telephone directory 17A to call a registered telephone number, the telephone number registered in the electronic telephone directory 17A is entered to dial through the operation section 11. Then, the calling times, days of the week and time periods of each telephone number are stored in the calling information list 17B as described afterward.

In a case where the voice recognition calling function is registered in the calling information list 17B, a calling party number (calling number) is notified, and a function setting situation is stored in the calling information list 17B as described afterward.

FIG. 6 shows an example of a list of calling times in todays of the week and time periods for every telephone number prepared in the calling information list 17B.

As shown in FIG. 6, the calling times Xab of each of a plurality of telephone numbers 1 to n is stored for Sunday, Monday, Tuesday, Wednesday, Thursday, Friday and Saturday and periods of 6:00–12:00, 12:00–18:00, 18:00–24:00 and 24:00–6:00.

Suffix a of the calling times Xab indicates the telephone numbers by a registration number of three digits, and suffix b indicates a day of the week and a time period in two digits.

For example, suffix "001" of the calling times X00111 indicates that the registration number of the telephone number is 001. The next suffix "1" indicates Sunday. The last suffix "1" indicates that the time zone is 6:00–12:00.

Column of TOTAL (a) in FIG. 6 indicates a total value by Xttl11 for all the telephone numbers by automatically totaling the calling times in each day of the week and each time zone.

Here, suffix "ttl" means a total, and the next suffix "11" indicates the time zone 6:00–12:00 on Sunday.

Column of TOTAL (b) in FIG. 6 indicates a total value by X001ttl for all the telephone numbers by automatically totaling the calling times in the days of the week and time zones.

Xttlttl in FIG. 6 indicates a total of calling times of a plurality of telephone numbers 1 to n in all the days of the week and all the time periods.

Thus, lists 11 through 74 of the calling times of the plurality of telephone numbers in each of the plurality of time periods for each day of the week are prepared.

When the electronic telephone directory 17A is opened as will be described afterward, the telephone number sorting section 14A judges the day of the week and the time period of the calling times and selects a corresponding list with reference to the calling information list 17B. The telephone number sorting section 14A refers to the selected list and sorts the telephone numbers in the electronic telephone directory 17A in the order of a decreasing calling frequency of the telephone numbers.

The aforesaid table covers the days of the week and the time periods but may cover the days of the week or the time periods only so to comply with the life style of the user.

FIG. 7 shows an example of a calling frequency list in days of the week and time periods of the telephone numbers prepared in the calling information list 17B.

In addition to the list managing the calling times of FIG. 6, the calling times in each time period and of each telephone number shown in FIG. 6 is divided by TOTAL (a) in each time period, and the calling frequency of each telephone number in each time period is managed for example as P00111 as shown in FIG. 7.

The above calling frequency is defines as Pab=Xab/Xttlb. Therefore, TOTAL in FIG. 7 is "1".

AVERAGE in FIG. 7 indicates the average of the calling frequencies of the respective telephone numbers in respective days of the week and rime periods and is defined as Pattl=Xattl/Xttlttl.

Every time a telephone number is called, the number of calling times is added to the column of days of the week and time periods. FIG. 8 shows an example of addition where the telephone number 1 is dialed in 6:00–12:00 on Sunday prepared in the calling information list 17B.

As shown in FIG. 8, when the telephone number 001 is called in the time zone of 6:00–12:00 on Sunday, the number of calling times becomes X00111+1 by adding 1. Thus, totaling is effected automatically in TOTAL (a) in FIG. 8, and 1 is added so to have the total value as Xttl11+1. Further, totaling is effected automatically in TOTAL (b) in FIG. 8 and 1 is added so to have the total value as X001ttl+1. Similarly, a total of calling times becomes Xttlttl+1 by addition of 1.

FIG. 9 shows an example of recalculated results of the calling frequency list prepared in the calling information list 17B of the telephone numbers of FIG. 7 in the days of the week and the time periods based on FIG. 8.

As shown in FIG. 9, recalculation is made as P'00111 to P'nll and P'001ttl to P'nttl. Thus, the calling frequency P'ab of each telephone number in the called day of the week and time period and the calling frequency P'attl of each telephone number in all the days of the week and the time periods are updated.

FIG. 10 shows an example of calculating priority of telephone numbers in function setting prepared in the calling information list 17B.

As shown in FIG. 10, the priority of the telephone numbers is calculated as numerical values according to the function setting situation of the telephone numbers registered in the electronic telephone directory.

Yac in FIG. 10 indicates a setting condition of function c (two-digit indication) with respect to registration number a (three-digit indication) of a telephone number. The function setting includes voice recognition registration, calling party number (calling number) notification-related function and the like.

Yac is "1" when the function is set but "0" when it is not set.

Qc in FIG. 10 is a numerical value of points when the function c has been determined for a telephone number and its numerical value is determined to be large when the relation with the retrieval of the electronic telephone directory becomes deeper.

After Qc is set by determining Yac, Fac and Fattl of FIG. 10 are calculated by the following equations.

$$Fac = Yac/Yttlc * Qc$$

$$Fattl = \Sigma Fac \quad (1)$$

Calculated result Fattl is a total of (the numerical point value of the function)/(the number of set functions) of every telephone number when the function has been determined and indicates the priority of the telephone number with the function setting.

The calculated sum of "calling frequency (P'attl) of every telephone number in all of the days of the week and the time periods" and "priority (Fattl) of the telephone number with the function set" becomes the priority (priority of the telephone numbers not relevant to the time element) of the telephone numbers in all of the days of the week and the time periods.

Here, calling ratio Rb of the called day of the week and time period in all of the days of the week and the time periods is determined as follows.

$$Rb = (Xttlb+1)/(Xttlttl+1) \quad (2)$$

Expected calling frequency Sab is calculated by using the above calculated result as follows.

$$Sab = Rb * P'ab + P'attl + Fattl \quad (3)$$

According to the calculated result, a first item is "the product of the calling ratio Rb in all of the pertinent days of the week and the time periods and the calling frequency P'ab in the called days of the week and the time periods".

This product means a ratio of the number of calls (Xab+1) in the called day of the week and the time period to all the number of calls (Xttlttl+1).

A second item is "P'attl which is the average calling frequency of every telephone number in all the days of the week and the time periods", and a third item is "priority (Fattl) of the telephone number with the function set". The second and third items are not associated with a time element.

It is to be noted that any of the following equations may be applied in order to comply with the life style of the user.

$$Sab = Rb * P'ab + Fattl \quad (4)$$

$$Sab = Rb * P'ab + P'attl \quad (5)$$

$$Sab = P'attl + Fattl \quad (6)$$

$$Sab = Rb * P'ab \quad (7)$$

$$Sab = P'attl \quad (8)$$

FIG. 11 shows a list of an example of calculated results of the expected calling frequency Sab prepared in the calling information list 17B (the equation (3)).

The expected calling frequency SAB is recalculated only for the called day of the week and the time period. For example, recalculation is made for S00111 to Sn11 in FIG. 11.

FIG. 2 is a flowchart showing a basic controlling operation for automatic sorting of the electronic telephone directory 17A in the memory 17 by the telephone number sorting section 14A of the control section 14 of FIG. 1. In step S201, the mobile communication terminal equipment is assumed to be in a waiting state.

In step S202, the control section 14 judges whether or not the operation of the operation section 11 enters a telephone number.

In step S203, the control section 14 makes the display section 12 to display the telephone number when it is entered in step S202, and the telephone number sorting section 14A of the control section 14 judges whether or not it agrees with the telephone number registered in the electronic telephone directory 17A. If not, the process goes to step S205.

When the telephone number is not entered in step S202, the control section 14 controls the telephone number sorting section 14A to display the telephone number by opening the electronic telephone directory 17A in step S204. When the displayed telephone number is not a desired telephone number, the operation section 11 is operated for scrolling so to display the desired telephone number.

When the telephone number entered in step S203 is not a telephone number registered in the electronic telephone directory 17A in step S203, the telephone number sorting section 14A terminates the process after dialing the input telephone number in step S205.

In step S206, the telephone number sorting section 14A judges whether or not the telephone number agreed in step S203 is dialed and the telephone number shown in step S204 is dialed, and terminates the processing if the telephone number is not dialed.

When the telephone number is dialed in step S206, the control section 14 controls to store the dialed telephone number, time and day of the week by the telephone number sorting section 14A in step S207.

In step S208, the telephone number sorting section 14A adds only one to the calling times in the column of pertinent day of the week and time period related to the pertinent telephone number in the calling list in each day of the week and the time period after the telephone call is completed (see FIG. 8).

In step S209, the telephone number sorting section 14A refers to the list opened by designating the calling information list 17B corresponding to the day of the week and the time period to sort the telephone numbers in the electronic telephone directory 17A in the order in which the number of calling times decreases.

Therefore, when the electronic telephone directory is opened next time, the telephone numbers having high calling frequency in the electronic telephone directory can be displayed with priority, so that the desired telephone number can be dialed easily and quickly.

FIG. 3 is a flow chart showing another example of the automatic sorting control operation by the telephone number sorting section 14A of FIG. 2. In step S301, after a telephone in call is finished, the telephone number sorting section 14A opens the calling information list 17B which indicates the calling times in the day of the week and the time period for every registered telephone number to sort the telephone numbers in the electronic telephone directory as shown in FIG. 6.

In step S302, the telephone number sorting section 14A performs an addition to the calling times in the column of day of the week and the time period for the dialed telephone number (see FIG. 8).

In step S303, the telephone number sorting section 14A performs an addition to the calling times in the column of day of the week and the time period for the dialed telephone number (see FIG. 8).

In step S303, the telephone number sorting section 14A recalculates the calling frequency Pab of every telephone number in the dialed day of the week and the time period of FIG. 7 to P'ab based on the calling information list 17B to which the addition was performed (see FIG. 9).

In step S304, the telephone number sorting section 14A calculates the calling frequency P'attl of every telephone number in all the days of the week and the time periods (see FIG. 9).

In step S305, the telephone number sorting section 14A calculates the priority numerical value Fattl of the telephone number according to the function setting (see the equation (1)).

In step S306, the telephone number sorting section 14A calculates the calling ratio Rab of the called days of the week and the time periods in all the days of the week and the time periods (see the equation (2)).

In step S307, the telephone number sorting section 14A calculates the expected calling frequency Sab in view of the calculated results of the calling frequency, calling ratio and priority of the telephone number (see the equation (3)).

In step S308, the telephone number sorting section 14A judges whether or not there is a telephone number which has the same calculated result Sab.

In section S309, the telephone number sorting section 14A, when there is the same telephone number, sorts the telephone numbers having the same calculated result Sab as default.

In step S310, the telephone number sorting section 14A sorts the electronic telephone directory 17A in the order in which the numerical values of the calculated result Sab decreases.

The expected calling frequency Sab is a numerical value of every telephone number in the called day of the week and the time period. After the telephone call is completed, the telephone numbers in the electronic telephone directory are sorted based on the expected calling frequency Sab. Therefore, when the electronic telephone directory is opened next time, the telephone numbers with high priority are displayed with precedence according to a record of dialing up to the last time and the function set conditions. Therefore, the desired telephone number can be dialed readily and quickly.

In other words, by determining a method of sorting the telephone numbers in the electronic telephone directory 17A, the electronic telephone directory can be sorted automatically in conformity with the life style of the user and the function setting condition, and the operability of the electronic telephone directory can be improved.

FIG. 4 is a flowchart showing another example of the automatic sorting control operation by the telephone number sorting section 14A of FIG. 2. In step S401, when the electronic telephone directory 17A is opened, a sorting rule of the telephone number sorting section 14A is opened.

In step S402, it is judged whether or not the setting function related to the rule of the telephone number sorting section 14A designates the unit of sorting the electronic telephone directory. If not, the process goes to step S409.

If designated, the telephone number sorting section 14A judges in step S403 whether or not the designation of the sorting unit is both of the day of -he week and the time period.

When the units of both of the day of the week and the time period are designated, the telephone number sorting section 14A designates the sorting day of the week and the time period according to the designation in step S404. For example, the designation is made for all the days of the week and the time periods (all matrix prepared (see FIG. 6)). And, he designation may be made as 6:00 to 18:00 on Saturday and Sunday. Then, the process goes to step S408.

When both of them are not designated in step S403, the telephone number sorting section 14A judges in step S405 whether or not the designation is limited to the day of the week only.

When the day of the week only is designated, the telephone number sorting section 14A designates the days of the week in step S406. For example, Monday to Sunday are designated in this order. Then, the process goes to step S408.

When the time period only is designated, the telephone number sorting section 14A designates the time period in step S407. For example, the designation is made as 6:00–18:00. Then, the process goes to step S408.

To sort the electronic telephone directory according to the day of the week and the time period designated for sorting, addition of the average calling frequency in all the days of the week and the time periods is determined in step S408.

Addition of the function setting condition such as voice recognition registration to the electronic telephone directory is determined in step S409.

Therefore, the sorting unit of the electronic telephone directory 17A can be the days of the week only or the time periods only according to the sorting rule of the telephone number sorting section 14A. Further, the telephone numbers having high priority can be displayed with precedence according to only the function setting of the electronic telephone directory 17A.

Therefore, a route of steps for processing the desired telephone number with higher priority can be selected when the electronic telephone directory 17A is opened.

FIG. 5 is a flowchart showing still another example of the automatic sorting control operation by the telephone number sorting section 14A of FIG. 2. In step S501, after the telephone number obtained from the electronic telephone directory by sorting the electronic telephone directory is dialed or a telephone number registered in the electronic telephone directory is dialed by entering through the operation section 11, the telephone number sorting section 14A checks the completion of the telephone calling.

After the completion of the telephone calling, the sorting rule of the telephone number sorting section 14A is checked to open the electronic telephone directory 17A in step S502. It is judged whether the sorting unit of the telephone number sorting section 14A is designated to "a day of the week", "a time period" or "both of a day of the week and a time period". If none of them is designated, the process goes to step S510.

When any of them is designated, the telephone number sorting section 14A judges in step S503 whether or not a call is made in the day of the week or the time period designated for sorting. If the call is not made in the designated day of the week and the time period, the process goes to step S510.

If the call is made in the designated day of the week and the time period, the telephone number sorting section 14A opens the pertinent calling information list 17B in step S504 (see FIG. 6).

In step S505, the telephone number sorting section 14A performs an addition to the calling times of the telephone number in the dialed day of the week and the dialed time period from the opened calling information list 17B.

In step S506, the telephone number sorting section 14A calculates the calling frequency P'ab (see FIG. 9) of every telephone number in the dialed days of the week and the time periods.

In step S507, the telephone number sorting section 14A judges whether or not the average calling frequency is added. If not, the process goes to step S513.

If the average calling frequency is added, the telephone number sorting section 14A calculates the average calling frequency P'attl (see FIG. 9) in step S508.

In step S509, the telephone number sorting section 14A calculates the calling ratio Rab (see the equation (2)) of the called days of the week and the time period in all the days of the week and the time periods.

When the electronic telephone directory sorting unit is not designated in step S502, the telephone number sorting section 14A invokes the calling times on the whole (the list of TOTAL (a) only of FIG. 6) when a call is made other than the designated day of the week and the time period in step S510.

In step S511, the telephone number sorting section 14A makes an addition to the calling times of the dialed telephone number.

In step S512, the telephone number sorting section 14A calculates the average calling frequency P'attl (see FIG. 9). Then, the process goes to step S513.

In step S513, the telephone number sorting section 14A judges whether or not the priority of the telephone number according to the function setting is added. If not, the process goes to step S515.

When the addition is determined, the telephone number sorting section 14A calculates the priority numerical value Fattl (see the equation (1)) in step S514.

In step S515, the telephone number sorting section 14A calculates the expected calling frequency Sab from the last calculated P'ab, P'attl, Rab and Fattl and sorts the telephone numbers in the electronic telephone directory 17A in the order of the decreasing numerical values of the expected calling frequency Sab.

The equation (3) is calculated according to steps S501, 502, 503, 504, 505, 506, 507, 508, 509, 513, 514 and 515.

The equation (4) is calculated with steps S508 and 509 bypassed from step S507.

The equation (5) is calculated with step S514 bypassed from step S513.

The equation (6) is calculated according to steps S510, S511, 512, 513, 514 and 515.

The equation (7) is calculated with steps S508 and 509 bypassed from step S507 and step S514 bypassed from step S513.

The equation (8) is calculated according to step S510 and steps S511, 512, 513 and 515 with step S514 bypassed.

Therefore, any one of the equations (3), (4), (5), (6), (7) and (8) for determining the expected calling frequency Sab can be selected according to the sorting rule of the telephone number sorting section 14A.

Thus, one of the equations (3), (4), (5), (6), (7) and (8) can be selected according to the sorting rule of the telephone number sorting section 14A so that the desired telephone number is in a higher rank of order when the electronic telephone directory 17A is opened so to comply with the life style of the user.

As described above, according to the present invention, because the telephone numbers of the electronic telephone directory are sorted automatically according to the function setting condition of the electronic telephone directory and the day of the week and the time period when the electronic telephone directory is opened, the order of the telephone numbers in the electronic telephone directory conforms to the life style of the user and the priority of the telephone numbers which the user considers, and when the electronic telephone directory is opened, the retrieving order can be simplified and the operability such as time shortening can be improved.

Not only the calling frequency of every telephone number in the dialed day of the week and the time period but also the calling frequency of every telephone number in all of the days of the week and the time periods and the calling ratio of the pertinent days of the week and the time periods in all of the days of the week and the time periods are taken into consideration, so that the telephone numbers having a higher calling frequency in the pertinent day of the week and the time period can be shown with precedence from the calling information list.

Conversely, even when the calling frequency in the pertinent day of the week and the time period is low and the sorting of the electronic telephone directory according to the calling frequency in the pertinent days of the week and the time periods only is difficult, the telephone numbers can be displayed from the calling information list according to the average of the calling frequencies.

The increase of the number of telephone numbers registered in the electronic telephone directory owing to high functionality of the mobile communication terminal equipment and complication of the retrieving method involved are anticipated to occur in the future. But, a problem of the operability for retrieving the electronic telephone directory can be remedied according to the present invention.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An automatic sorting system for an electronic telephone directory to sort telephone numbers in the electronic telephone directory, comprising:

a calling information list indicating an expected outgoing calling frequency in each day of the week and time period on the basis of a priority numerical value of the telephone numbers according to the outgoing calling times and function setting conditions of the telephone numbers in each day of the week and time period; and telephone number sorting means which automatically sorts and indicates the telephone numbers in lowering order of the expected outgoing calling frequency with reference to the calling information list for days of the week and time periods when the electronic telephone directory is opened.

2. The automatic sorting system for an electronic telephone directory according to claim 1, wherein said expected calling frequency (Sab) is expressed as follows:

$$Sab = Rb * P'ab + P'attl + Fattl$$

where, Rb*P'ab is (the calling times of the pertinent telephone number in the pertinent day of the week and time period)/(all the calling times of all the telephone numbers), P'attl is (all the calling times of the pertinent telephone number)/(all the calling times of all the telephone numbers), and Fattl is (priority of the pertinent telephone number).

3. The automatic sorting system for an electronic telephone directory according to claim 1, wherein said expected calling frequency (Sab) is expressed as follows:

$$Sab = \text{(the calling times of the pertinent telephone number in the pertinent day of the week)/(all the calling times of all the telephone numbers)} + P'attl + Fattl,$$

where, P'attl is (all the calling times of the pertinent telephone number)/(all the calling times of all the telephone numbers), and Fattl is (priority of the pertinent telephone number).

4. The automatic sorting system for an electronic telephone directory according to claim 1, wherein said expected calling frequency (Sab) is expressed as follows:

$$Sab = \text{(the calling times of the pertinent telephone number in the pertinent time period)/(all the calling times of all the telephone numbers)} + P'attl + Fattl,$$

where, P'attl is (all the calling times of the pertinent telephone number)/(all the calling times of all the telephone numbers), and Fattl is (priority of the pertinent telephone number).

5. The automatic sorting system for an electronic telephone directory according to claim 1, wherein said expressed calling frequency (Sab) is expressed as follows:

$$Sab = Fattl,$$

where, Fattl is (priority of the pertinent telephone number).

6. The automatic sorting system for an electronic telephone directory according to claim 1, wherein said expected calling frequency (Sab) is expressed as follows:

$$Sab = Rb * P'ab + Fattl,$$

where, Rb*P'ab is (the calling times of the pertinent telephone number in the pertinent day of the week and time period)/(all the calling times of all the telephone numbers), and Fattl is (priority of the pertinent telephone number).

7. The automatic sorting system for an electronic telephone directory according to claim 1, wherein said expected calling frequency (Sab) is expressed as follows:

$$Sab = Rb * P'ab + P'attl,$$

where, Rb*P'ab is (the calling times of the pertinent telephone number in the pertinent day of the week and the time period)/(all the calling times of all the telephone numbers), and P'attl is (all the calling times of the pertinent telephone number)/(all the calling times of all the telephone numbers).

8. The automatic sorting system for an electronic telephone directory according to claim 1, wherein said expected calling frequency (Sab) is expressed as follows:

$$Sab = P'attl + Fattl,$$

where, P'attl is (all the calling times of the pertinent telephone number)/(all the calling times of all the telephone numbers), and Fattl is (priority of the pertinent telephone number).

9. The automatic sorting system for an electronic telephone directory according to claim 1, wherein said expected calling frequency (Sab) is expressed as follows:

$$Sab = P'attl$$

where, P'attl is (all the calling times of the pertinent telephone number)/(all the calling times of all the telephone numbers).

10. The automatic sorting system for an electronic telephone directory according to claim 1, wherein said expected calling frequency (Sab) is expressed as follows:

$$Sab = Rb * P'ab,$$

where, Rb*P'ab is (the calling times of the pertinent telephone number in the pertinent day of the week and the time period)/(all the calling times of all the telephone numbers).

11. The automatic sorting system for an electronic telephone directory according to claim 1, wherein said expected calling frequency (Sab) is alternatively selected from the following:

$$Sab = Rb * P'ab + P'attl + Fattl$$

$$Sab = \text{(the calling times of the pertinent telephone number in the pertinent day of the week)/(all the calling times of all the telephone numbers)} + P'attl + Fattl,$$

$$Sab = \text{(the calling times of the pertinent telephone number in the pertinent time period)/(all the calling times of all the telephone numbers)} + P'attl + Fattl,$$

$$Sab = Fattl,$$

$$Sab = Rb * P'ab + Fattl,$$

$$Sab = Rb * P'ab + P'attl,$$

$$Sab = P'attl + Fattl,$$

$$Sab = P'attl, \text{ and}$$

$$Sab = Rb * P'ab,$$

where, Rb*P'ab is (the calling times of the pertinent telephone number in the pertinent day of the week and time period)/(all the calling times of all the telephone numbers), P'attl is (all the calling times of the pertinent telephone number)/(all the calling times of all the telephone numbers), and Fattl is (priority of the pertinent telephone number).

12. An automatic sorting method for an electronic telephone directory to sort telephone numbers in the electronic telephone directory, comprising:

a step for preparing as a calling information list an expected outgoing calling frequency in each day of the week and time period according to a priority numerical value of the telephone numbers according to the outgoing calling times and function setting conditions of the telephone numbers in each day of the week and time period; and a step for automatically sorting and indicating the telephone numbers in lowering order of the expected outgoing calling frequency with reference to the calling information list for days of the week and time periods when the electronic telephone directory is opened.

13. An automatic sorting system for sorting telephone numbers in an electronic telephone directory, comprising:

means for preparing a time situation information list indicating the calling times of telephone numbers in each day and time for every user;

means for preparing a function setting situation information list indicating priority numerical values of the telephone numbers according to a function setting condition for every user;

means for calculating an expected calling frequency in each day of the week and time period according to the calling times of telephone numbers in each day and time and the priority numerical values of the telephone numbers; and telephone number sorting means which automatically sorts and indicates the telephone numbers in lowering order of the expected calling frequency for days of the week and time periods when the electronic telephone directory is opened;

wherein said expected calling frequency (Sab) is selected from the following:

$Sab=Rb*P'ab+P'attl+Fattl$ $Sab$=(the calling times of the pertinent telephone number in the pertinent day of the week)/(all the calling times of all the telephone numbers)+$P'attl$+$Fattl$, $Sab$=(the calling times of the pertinent telephone number in the pertinent time period)/(all the calling times of all the telephone numbers)+$P'attl$+$Fattl$, $Sab=Fattl$, $Sab=Rb*P'ab+Fattl$, $Sab=Rb*P'ab+P'attl$, $Sab=P'attl+Fattl$, $Sab=P'attl$, and $Sab=Rb*P'ab$, where, $Rb*P'ab$ is (the calling times of the pertinent telephone number in the pertinent day of the week and time period)/(all the calling times of all the telephone numbers), $P'attl$ is (all the calling times of the pertinent telephone number)/(all the calling times of all the telephone numbers), and Fattl is (priority of the pertinent telephone number).

14. An automatic sorting method for sorting telephone numbers in an electronic telephone directory, comprising the steps of:

preparing a time situation information list indicating the calling times of telephone numbers in each day and time for every user;

preparing a function setting situation information list indicating priority numerical values of the telephone numbers according to a function setting condition for every user;

calculating an expected calling frequency in each day of the week and time period according to the calling times of telephone numbers in each day and time and the priority numerical values of the telephone numbers; and automatically sorting and indicating the telephone numbers in lowering order of the expected calling frequency for days of the week and time periods when the electronic telephone directory is opened;

wherein said expected calling frequency (Sab) is selected from the following:

$Sab=Rb*P'ab+P'attl+Fattl$ $Sab$=(the calling times of the pertinent telephone number in the pertinent day of the week)/(all the calling times of all the telephone numbers)+$P'attl$+$Fattl$, $Sab$=(the calling times of the pertinent telephone number in the pertinent times period)/(all the calling times of all the telephone numbers)+$P'attl$+$Fattl$, $Sab=Fattl$, $Sab=Rb*P'ab+Fattl$, $Sab=Rb*P'ab+P'attl$, $Sab=P'attl$, and $Sab=Rb*P'ab$, where, $Rb*P'ab$ is (the calling times of the pertinent telephone number in the pertinent day of the week and time period)/(all the calling times of all the telephone numbers), $P'attl$ is (all the calling times of the pertinent telephone number)/(all the calling times of all the telephone numbers), and Fattl is (priority of the pertinent telephone number).

* * * * *